United States Patent
Huang

(10) Patent No.: US 7,872,376 B2
(45) Date of Patent: Jan. 18, 2011

(54) MULTI-INPUT POWER-SWITCHING CIRCUIT

(75) Inventor: Yung-Hsin Huang, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 0 days.

(21) Appl. No.: 12/122,977

(22) Filed: May 19, 2008

(65) Prior Publication Data

US 2009/0284077 A1 Nov. 19, 2009

(51) Int. Cl.
*H02J 4/00* (2006.01)
(52) U.S. Cl. .......................... 307/87; 307/85
(58) Field of Classification Search .............. 307/85–87, 307/64, 66
See application file for complete search history.

(56) References Cited

U.S. PATENT DOCUMENTS

| | | | | |
|---|---|---|---|---|
| 3,555,290 | A * | 1/1971 | Ellermeyer | 307/65 |
| 4,713,553 | A * | 12/1987 | Townsend et al. | 307/64 |
| 4,754,161 | A * | 6/1988 | Fox | 307/87 |
| 5,519,261 | A * | 5/1996 | Stewart | 307/87 |
| 5,668,417 | A * | 9/1997 | Wiscombe et al. | 307/64 |
| 6,330,176 | B1 * | 12/2001 | Thrap et al. | 363/142 |
| 6,535,405 | B2 * | 3/2003 | Chen | 363/65 |
| 6,628,013 | B2 * | 9/2003 | Vogman | 307/85 |
| 2003/0090158 | A1 * | 5/2003 | Fauh et al. | 307/87 |
| 2009/0284077 | A1 * | 11/2009 | Huang | 307/80 |

FOREIGN PATENT DOCUMENTS

| | | |
|---|---|---|
| TW | 507974 | 10/2002 |
| TW | 561676 | 11/2003 |
| TW | 269518 | 12/2006 |

* cited by examiner

*Primary Examiner*—Fritz M Fleming
(74) *Attorney, Agent, or Firm*—Muncy, Geissler, Olds & Lowe, PLLC

(57) ABSTRACT

The present invention discloses a multi-input power-switching circuit, which comprises: more than one power input terminal, more than one detection/evaluation circuit, and a switching/controlling unit. A switch is arranged in the path via which the input power is received by the power input terminal and then transferred to the power conversion unit. Each detection/evaluation circuit receives a partial voltage signal from one input power and generates a detection signal according to the partial voltage signal. The switching/controlling unit receives the detection signals from the detection/evaluation circuits, determines which power input terminal has a higher voltage level according to the detection signals, and generates a turn-on signal to turn on the switch connected with the power input terminal having a higher voltage level. Thereby, the power conversion unit can acquire a higher voltage input power and provide a stable driving power for a load.

3 Claims, 3 Drawing Sheets

MULTI-INPUT POWER-SWITCHING CIRCUIT

FIELD OF THE INVENTION

The present invention relates to a multi-input power-switching circuit, which detects and evaluates the qualities of several power sources and then selects one of the power sources as the input power.

BACKGROUND OF THE INVENTION

An electronic device needs a stable power supply; therefore, the power supply device thereof has to provide a stable power supply for the electronic device. Generally, a power supply device is coupled to a power source to acquire an input power, and the power conversion unit of the power supply device converts the input power into a driving power and sends the driving power to loads. However, the conventional design has only one power source. The power source may be a commercial power or another power supply device. When the commercial power or the source power supply device fails, the electronic device will shut down. When the input power drops, the booster unit of the power supply device will be overburdened and thus damaged. Traditionally, a UPS (Uninterrupted Power System) is used to prevent the problems caused by the failure of a single power source. The UPS connects with the power supply device and provides a stable driving power for the electronic device when the power source fails, whereby the problem of abrupt power interruption is avoided. However, the UPS and the power supply device use the same power source. Therefore, the UPS cannot actively switch between different power sources but can only passively prolong the operation of the electronic device for a while. A Taiwan patent No. 1269518 disclosed a "Power Supply System Having AC Redundant and Wrong Plugging Prevention Functions", and a Taiwan patent No. 561676 disclosed a "Power Supply Device Having an AC Redundant Function" having the same circuit architecture as the former patent, wherein three DC power supply modules are connected in parallel, and two of them are respectively coupled to two different AC power sources, and a switching circuit switches the third one to connect with one of the two AC power sources. When one of the two AC power sources fails, the switching circuit can keep two DC power supply modules operating. However, the prior arts need three power supply modules and have the disadvantages of bulkiness and high price, which limit their applications. A Taiwan patent No. 507974 disclosed a "Power Supply Device Having Dual AC Power Sources Connected in Parallel", which detects whether the voltage input from a first power source is sufficient to excite the coil of a relay and then determines whether to turn on the input of the first power source. In fact, the prior art cannot really discriminate the levels of the two power sources.

SUMMARY OF THE INVENTION

One objective of the present invention is to provide a multi-input circuit architecture, which detects and evaluates the voltages of several power sources and then selects the highest-voltage power source as the input power to guarantee that the power conversion unit can output a stable driving power. Thereby, the present invention can solve the problem that the conventional power supply device having only one power source can only prolong the operation of the electronic device for a while with UPS, or other problems of conventional technologies.

The present invention proposes a multi-input power-switching circuit, which connects with more than one power source, wherein one of the power sources is selected to connect with a power conversion unit. The multi-input power-switching circuit of the present invention comprises: more than one power input terminal, more than one detection/evaluation circuit, and a switching/controlling unit. A switch is arranged in the path via which the input power is received by the power input terminal and then transferred to the power conversion unit. Each detection/evaluation circuit further comprises: a voltage division/separation unit, a filter/rectifier unit, and an amplifier unit. The voltage division/separation unit receives a partial voltage signal from one input power. The partial voltage signal is processed by the filter/rectifier unit, and then the amplifier unit generates a detection signal according to the partial voltage signal. The switching/controlling unit receives the detection signals from the detection/evaluation circuits, determines which power input terminal has a higher voltage level according to the detection signals, and generates a turn-on signal to turn on the switch connected with the power input terminal having a higher voltage level. Thereby, the power conversion unit can acquire a higher voltage input power and provide a stable driving power for a load.

DETAILED DESCRIPTION OF THE PREFERRED EMBODIMENTS

Below, the technical contents of the present invention will be described in detail in cooperation with the drawings.

Figure 1:
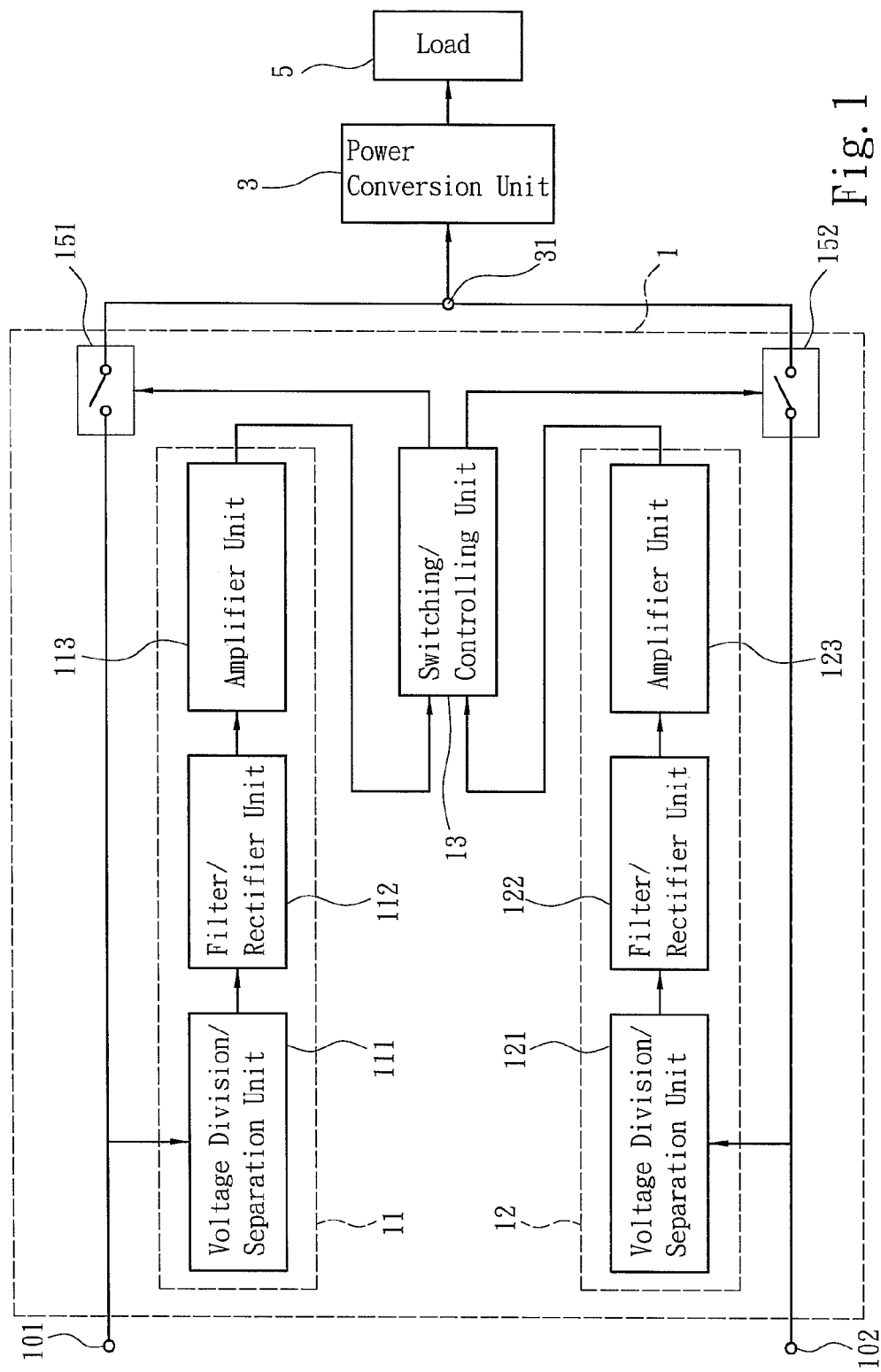
FIG. 1 is a block diagram showing the circuit of an embodiment of the present invention.

The present invention proposes a multi-input power-switching circuit, which acquires more than one power sources and selects one of the power sources to connect with a power conversion unit. The multi-input power-switching circuit of the present invention comprises: more than one power input terminal, more than one detection/evaluation circuit, and a switching/controlling unit. Refer to FIG. 1 a block diagram showing the circuit of an embodiment of the present invention. The multi-input power-switching circuit 1 has two power input terminals 101 and 102 respectively receiving different input powers from different power sources. Two switches 151 and 152 are respectively arranged in the paths via which the different input powers are transferred to a power conversion unit 3. One end of the switch 151/152 is coupled to the power input terminal 101/102, and the other end of the switch 151/152 is coupled to a connection terminal 31 of the power conversion unit 3. The power input terminals 101 and 102 are respectively coupled to detection/evaluation circuits 11 and 12. The detection/evaluation circuit 11/12 further comprises: a voltage division/separation unit 111/121, a filter/rectifier unit 112/122, and an amplifier unit 113/123. The voltage division/separation units 111 and 121 respectively receive partial voltage signals from the different input powers. The partial voltage signals are respectively processed by the filter/rectifier units 112 and 122, and then the amplifier units 113 and 123 generate detection signals according to the partial voltage signals and send the detection signals to a switching/controlling unit 13. The switching/controlling unit 13 receives the detection signals of the detection/evaluation circuits 11 and 12 and determines which one of the power input terminals 101 and 102 has a higher voltage level according to the detection signals. Then, the switching/controlling unit 13 generates a turn-on signal to turn on the switch 151/152 connected with the power input terminal 101/102 having a higher voltage level. Thus, the power conversion unit 3 acquires the input power having a higher voltage level via the connection terminal 31 and provides a stable driving power for a load 5. The circuit of the present invention can detect and evaluate the voltage levels of several input powers and switch to connect with different input powers according to the voltage levels thereof. When the input power used by the power conversion unit 3 drops, the switching/controlling unit 13 can detect the voltage variation and switch to another input power having a higher voltage level to guarantee that the power conversion unit 3 can output a stable driving power.

Figure 2:
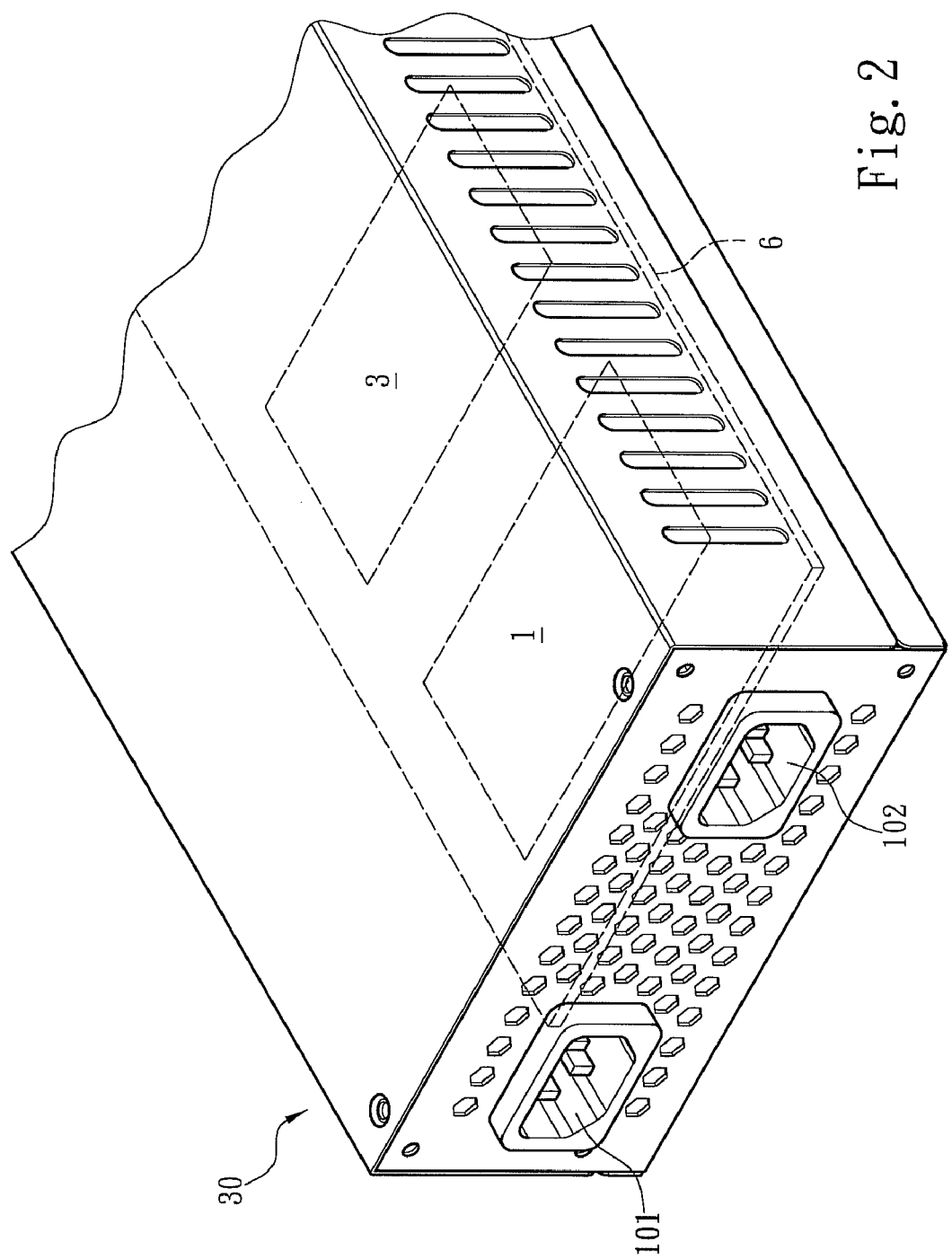
FIG. 2 is a diagram schematically showing an embodiment that the present invention is applied to a power supply device.
Figure 3:
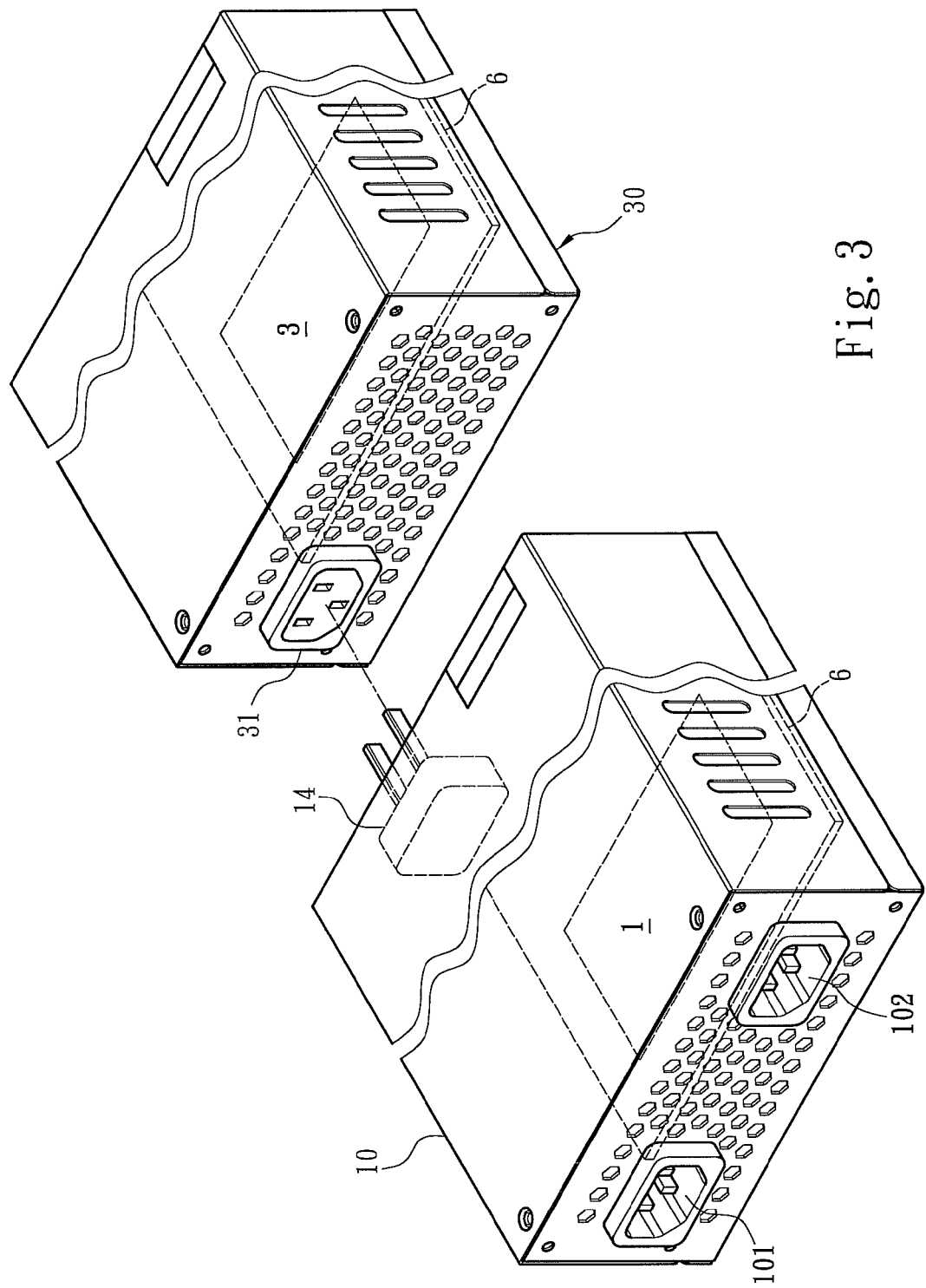
FIG. 3 is a diagram schematically showing another embodiment that the present invention is applied to a power supply device.

Refer to FIG. 2 a diagram schematically showing an embodiment that the present invention is applied to a power supply device. In this embodiment, the multi-input power-switching circuit 1 and the power conversion unit 3 are integrated with a printed circuit board 6 and accommodated inside a casing 30 to form a power supply device. The power input terminals 101 and 102 are arranged on the surface of the casing 30 to receive different input powers, so that the multi-input power-switching circuit 1 can switch between at least two input powers. Refer to FIG. 3 a diagram schematically showing another embodiment that the present invention is applied to a power supply device. In this embodiment, the multi-input power-switching circuit 1 is independently integrated with a printed circuit board 6, and the multi-input power-switching circuit 1 and the power conversion unit 3 are separately accommodated in two casings 10 and 30. The power input terminals 101 and 102 are arranged on the surface of the casing 10 accommodating the multi-input power-switching circuit 1 to receive different input powers. Connection terminals 31 and 14 are respectively arranged in the casing 30 accommodating the power conversion unit 3 and the casing 10. When the multi-input power-switching circuit 1 and the power conversion unit 3 are separated, the power conversion unit 3 can receive an input power via the connection terminal 31 and function as a general power supply device. Therefore, the modularized multi-input power-switching circuit 1 can be mounted on and dismounted from a general power supply device in this embodiment.

The preferred embodiments described above are to exemplify the present invention but not to limit the scope of the present invention. Therefore, any equivalent modification or variation according to the spirit of the present invention is to be also included within the scope of the present invention, which is based on the claims stated below.

The above-mentioned circuit architectures can achieve the objectives of the present invention and have improvements over the prior arts. Therefore, the present invention possesses novelty and non-obviousness and meets the conditions for a patent. Thus, the Inventor files the application for a patent. It will be appreciated if the application is approved fast.

What is claimed is:

1. A multi-input power-switching circuit, which acquires more than one input power and selects one said input power to connect with a power conversion unit, comprising:

more than one power input terminal respectively receiving said input powers, wherein a switch is arranged in each path via which one of said input powers is transferred from said power input terminal to said power conversion unit;

more than one detection/evaluation circuit each including: a voltage division/separation unit, a filter/rectifier unit connected to said voltage division/separation unit in series, and an amplifier unit connected to said filter/rectifier unit in series, wherein said voltage division/separation unit is connected to said path to receive a partial voltage signal from one of said input powers and outputs said partial voltage signal to said filter/rectifier unit; said partial voltage signal is processed by said filter/rectifier unit, and then said amplifier unit generates a detection signal according to said partial voltage signal; and a switching/controlling unit connected to an output of each of said amplifier units to receive said detection signal from each of said detection/evaluation circuits, determining which of said power input terminals has a higher voltage level according to said detection signals, generating a turn-on signal to turn on said switch connected with said power input terminal having a higher voltage level;

wherein said multi-input power-switching circuit and said power conversion unit are separately accommodated in two casings, said casing accommodating said multi-input power-switching circuit has more than one said power input terminal; said casing accommodating said multi-input power-switching circuit and said casing accommodating said power conversion unit respectively have connection terminals, which can be selectively electrically connected to each other, so that if separated, the power conversion unit can receive an put power from its connection terminal to function as a general power supply device.

2. The multi-input power-switching circuit according to claim 1, which is integrated with a printed circuit board.

3. The multi-input power-switching circuit according to claim 1, wherein said input power is an AC input.

* * * * *